and to check the frequency with which a predetermined combination of digits occurs in the pulse train wherein each of the two above-mentioned function checkers includes a gating circuit, two integrators, voltage comparator and an indicator.

United States Patent

[11] 3,582,882

| [72] | Inventors | George E. Titcomb<br>Alexandria, Va.;<br>John M. Hovey, Oxon Hill, Md. |
|---|---|---|
| [21] | Appl. No. | 759,293 |
| [22] | Filed | Sept. 12, 1968 |
| [45] | Patented | June 1, 1971 |
| [73] | Assignee | The United States of America as represented by the Secretary of the Navy |

[54] RANDOMNESS MONITOR
6 Claims, 1 Drawing Fig.

[52] U.S. Cl. .................................................. 340/146.2,
235/177, 331/78
[51] Int. Cl. .................................................. G06f 7/02
[50] Field of Search ........................................... 235/177;
340/146.2; 331/78

[56] References Cited
UNITED STATES PATENTS

| 3,445,591 | 5/1969 | Koehler et al. ............... | 331/78X |
| 3,309,509 | 3/1967 | Vasseur ........................ | 235/177 |

Primary Examiner—Malcolm A. Morrison
Assistant Examiner—James F. Gottman
Attorneys—R. S. Sciascia and A. L. Branning ABSTRACT: A randomness monitor designed to check when the duty cycle of a train of pulses is other than 50 percent; and to check the frequency with which a predetermined combination of digits occurs in the pulse train wherein each of the two above-mentioned function checkers includes a gating circuit, two integrators, voltage comparator and an indicator.

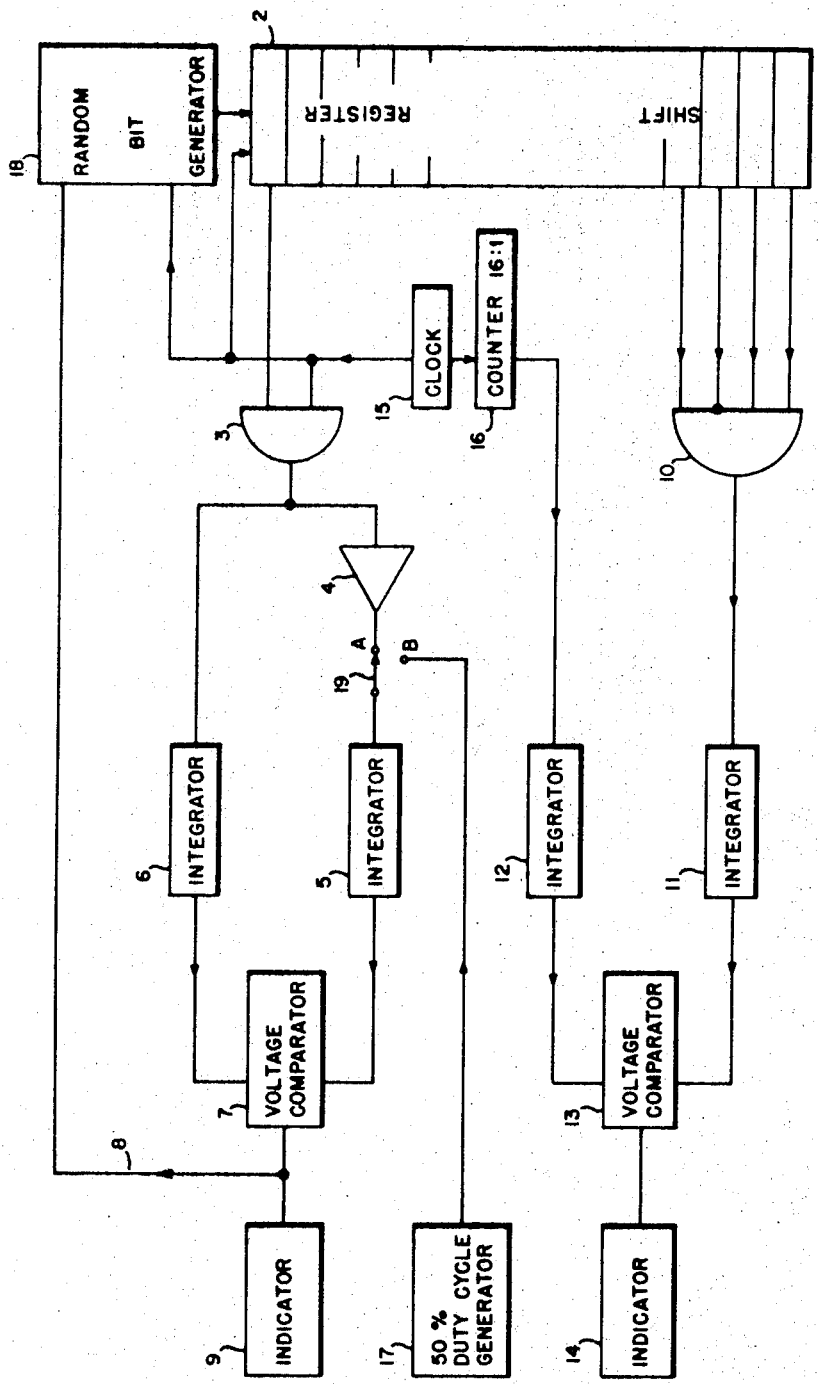

RANDOMNESS MONITOR

The invention described herein may be manufactured and used by or for The Government of the United States of America for governmental purposes without the payment of any royalties thereon or therefor.

The invention relates generally to electrical checking circuits and more particularly to circuits for automatically monitoring the random qualities of a series of binary digits.

Certain cryptographic equipment employs random bit generators in their coding operations. These generators must be monitored and controlled to insure that their output is purely random. Prior art methods of accomplishing this have used complex combinations of logic means whereby certain combinations of digits are counted and the randomness of the pulse train is judged by analyzing the frequency of occurrence of these combinations. These devices are complex in design, bulky and expensive to produce.

Accordingly, it is an object of the present invention to provide a means of monitoring and controlling the output of a bit generator to insure randomness.

It is another object to provide for a randomness monitoring system which is simple in design and inexpensive to manufacture.

Another object is to provide a circuit which monitors randomness with great accuracy.

A still further object is to provide a randomness monitoring system which operates continuously and automatically.

A complete understanding of the invention and of these and various other features thereof may be gained from consideration of the following detailed description and the accompanying drawing, in which:

The drawing is a block diagram of the system.

In the drawing, a random bit generator is shown at 18. Its output is a series of pulse or no-pulse conditions. As is well known in the art, the pulse, no-pulse conditions may alternately be termed on-off or 1—0 conditions, respectively. Ideally, generator 18 has purely random output. Such random generators are well known in the art. Certain of these random generators employ a source of noise and select only those amplitudes above a preselected bias level. By changing this bias level the generator can be controlled to produce a predominance of either 1's or 0's, or may be made to return to randomness if a predominance of either condition exists. In the drawing feedback loop 8 provides this control voltage. By randomness of the generator is meant that an equal number of 1's and 0's appear over a given output train.

The output of random generator 1 is fed into shift register 2. The register stages have two stable output voltages corresponding to the 1 and 0 input from the random bit generator. The output from one stage of the register is fed to "AND" gate 3 along with a clock pulse. "AND" gate 3 will provide an output voltage corresponding to the 1 condition when the clock pulse and a 1 from the shift register are concurrently present at its input. At any other time it will provide a 0 output. Thus for every 1 generated by the bit generator 18, the output of gate 3 will be 1.

The output from "AND" gate 3 is fed along two parallel paths. One path contains inverter 4 which provides a 0 output whenever its input is 1. The output from the inverter is fed to an integrator 5, which provides a voltage proportional to the average value of the output of inverter 4. The other path contains integrator 6 which provides a voltage proportional to the average value of the output of "AND" gate 3. The outputs from the integrators 5 and 6 are fed to a comparison circuit 7. The integrator circuit can be a conventional resistance capacitance network. The comparison circuit can consist of a conventional differential amplifier or bridge.

If the output of generator 18 is random it will produce 1's and 0's in equal amounts over a given series. This is termed a 50 percent duty cycle. It may be seen that if this condition is present, namely 50 percent duty cycle, the output of the voltage comparison circuit 7 will be null. This is so because the input to both integrators will be 1's for half the time. Both integrators over a given period will receive a 1 input for half the time, and the average value of the voltage into integrator 6 will be the same as the average value of the input to integrator 5. Thus a null would indicate a random signal.

To further understand the operation, consider the case where the 0 condition is represented by a 0 output voltage and the 1 condition by some positive voltage, and the bit generator is producing all 1 digits. The positive voltage corresponding to 1 will be fed into integrator 6 resulting in a large voltage out of the integrator. Since a constant stream of positive voltage pulses is being fed into integrator 6 the average value of these pulses out of the integrator 6 will also be same positive value. Due to inverter 4 the continuous succession of 1's fed into integrator 6 will be converted to a continuous succession of 0's into integrator 5 resulting in an average value of 0 at its output. Thus the output of the comparison circuit 7 will be large. A succession of all 0's will produce an equal but opposite polarity output from the comparison circuit. Thus when either all 0's or all 1's are being produced by the bit generator, a high potential difference will exist at indicator 9 warning the operator of a nonrandom train. For pulse trains containing more 0's than 1's a value intermediate a null and the above value will be present.

The output of the comparison unit can be coupled to the generator 1 by feedback loop 8 to adjust the bit generator or an indicator 9 may be read to alert the operator of a nonrandom condition so that corrective measures can be taken.

It must be noted that the particular arrangement described above is very sensitive in that small deviations from randomness are exaggerated. This occurs since integrators 5 and 6 tend to move in opposite directions on either side of pure randomness. Thus as the percent of 1's increases the output of integrator 6 increases in 1 direction away from its 50 percent duty cycle voltage while the output voltage from integrator 6 moves in an opposite direction away from this voltage. An increased sensitivity results from this arrangement.

An additional method of sensing for a 50 percent duty cycle can be employed as shown in the drawing. When the switch 19 is in position B it is possible to compare the input pulse train to a known standard. The generator 17 produces a 50 percent duty cycle train. By passing the output from 17 through an integrator 5 a DC voltage is produced which corresponds to the average value of the output of generator 17. This can be compared to the pulse train from the random bit generator in the voltage comparator.

Pulse trains with a 50 percent duty cycle are not necessarily random in that this is not the only criteria of randomness. This can be seen by analyzing the train 00110011. It is seen that the duty cycle of this train is 50 percent, that is, over the period half the digits are 1's and half are 0's. A train such as this will pass the 50 percent duty cycle test and indicator 9 will read a null. However the train is obviously not random. The invention utilizes gate 10, integrators 11 and 12, counter 16 and another comparison means 13 to sense and detect nonrandom repetitive pulse trains of the mentioned type. Gate 10 is shown as having four inputs connected to four separate stages of shift register 2. Gate 10 may be used to give an output upon the occurrence of a preselected combination of binary digits. As an example, the combination 1011 is chosen. The probability that this combination appear in a binary digit train which is random is 1 in 16. Thus if the given combination appears more or less than once for every 16 shifts of the register on an average the input train is not random. The output of gate 10 is fed to integrator 11. The clock pulse train 15 is fed to counter 16 which gives an output pulse for every 16 inputs. The integrator 12 has the same characteristics as integrator 11. Thus if the combination 1011 appears once every 16 clock pulses the comparator will be nulled. If the combination 1011 appears more or less often than every 16 clock pulses a voltage will appear across the comparator network indicating a nonrandom output from the generator.

It is within the scope of the invention to monitor a variety of combinations by means of gate 10. The combination could consist of any number of digits and any combination of digits.

It is obvious, however, that certain combinations provide a higher accuracy. Thus the use of a four digit combination is more accurate than a two digit combination. A four digit combination has been found to achieve a sufficient degree of accuracy while being simple to manufacture.

For example, the gate 10 could be seed to sense a three digit combination. In that instance if the pulse train input is random the particular combination sensed should occur once every eight shifts of the register. The divider counter 16 in this case would be selected to provide an output every eight clock pulses. If the three digit combination selected was sensed more or less often than every eighth clock pulse, the output from comparator 13 would give a signal to indicator 14.

Although any number of digits could be utilized to perform the testing at gate 10, it is obvious to one skilled in the art that a more complex combination will provide more accuracy. Thus using a 10 digit combination would increase accuracy at an increase in complexity of equipment. The use of a four digit combination has been selected as being a good compromise between accuracy and complexity.

In summary it can be said that any combination and any number of digits can be selected for gate 10. However, a greater number of digits will provide an improved accuracy, and specific combinations, selected such that they are sensitive to symmetrically repetitive binary trains provide even further accuracy.

Obviously many modifications and variations of the present invention are possible in light of the above teachings. It is therefore to be understood that within the scope of the appended claims the invention may be practiced otherwise than as specifically described.

What we claim and desire to be secured by Letters patent of the United States is:

1. A system for checking the randomness of a generator whose output is a series of one and other conditions, corresponding to two distinct voltage levels, comprising:
    first means coupled to the output of said generator for generating a first output proportional to the average value of said one condition,
    second means coupled to the output of said generator for producing a signal corresponding to said other condition upon each occurrence of said one condition,
    third means coupled to the output of said second means for generating a second output proportional to the average value of said signal, and
    comparison means coupled to the outputs of said first and third means for generating a second signal proportional to the difference between said first and second outputs.

2. A system for checking the randomness of a generator whose output is a series of first and second conditions, corresponding to two voltage levels, comprising:
    gate means coupled to said generator for providing a first output upon the occurrence of one of said conditions,
    inverting means connected to said gating means for producing a second output corresponding to said other condition on each occurrence of a said first output,
    integrator means coupled to said gating means and said inverting means for generating two separate signals proportional to the average value of each of said outputs,
    comparison means coupled to said integrator means for producing a signal proportional to the difference between said outputs, and
    indicator means coupled to said comparison means responsive to said signals whereby deviation from randomness is measured.

3. The system as in claim 1 further including, a feedback loop coupling the output of said comparison means to said generator for controlling the randomness of the generator output in response to the output of said comparison means.

4. A system for monitoring the randomness of a generator with an output train of binary digits comprising:
    means coupled to said generator for generating a first output when the duty cycle of the output train of said generator is other than 50 percent,
    indicator means responsive to said first output,
    gating means coupled to the output of said generator for producing a second output at each occurrence of a preselected combination of digits from said generator,
    sensing circuit means coupled to said gating means for generating a third output when said combination is present more or less often than required for randomness, said sensing circuit means comprising,
    means coupled to the output of said gating means for generating a third output proportional to the average value of the output from said gating means,
    means for generating a fourth output proportional to the average value of said second output when said generator output is random, and
    comparator means coupled to said third and fourth outputs for producing a signal proportional to the difference between said third and fourth outputs.

5. The system as recited in claim 1 further including,
    gating means coupled to the output of said generator for producing a third output at each occurrence of a preselected combination of digits from said generator, and
    sensing circuit means coupled to the output of said gating means for generating a third signal when said third output occurs more or less frequently than required for randomness.

6. The system as recited in claim 5 wherein said sensing circuit means comprises,
    fourth means coupled to the output of said gating means for generating a fourth output proportional to the average value of the output from said gating means,
    fifth means for generating a fifth output proportional to said fourth output when said bit generator is random, and
    comparator means coupled to said fourth and fifth outputs for producing a signal proportional to the difference between said fourth and fifth outputs.